United States Patent
Ranta

(10) Patent No.: US 7,706,844 B2
(45) Date of Patent: *Apr. 27, 2010

(54) INPUT DEVICE WITH USER BALANCED PERFORMANCE AND POWER CONSUMPTION

(75) Inventor: Craig S Ranta, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1058 days.

This patent is subject to a terminal disclaimer.

(21) Appl. No.: 11/278,587

(22) Filed: Apr. 4, 2006

(65) Prior Publication Data
US 2006/0166710 A1    Jul. 27, 2006

Related U.S. Application Data

(63) Continuation of application No. 10/319,470, filed on Dec. 16, 2002, now Pat. No. 7,050,798.

(51) Int. Cl.
*H04B 1/38* (2006.01)
*H04M 1/00* (2006.01)

(52) U.S. Cl. .............. 455/574; 455/127.1; 455/127.5; 455/343.3

(58) Field of Classification Search ............... 455/574, 455/127.1, 127.5, 343.3, 343.1, 343.2, 343.4, 455/343.5, 423, 425, 67.11
See application file for complete search history.

(56) References Cited

U.S. PATENT DOCUMENTS

| 7,231,198 | B2* | 6/2007 | Loughran ............ 455/343.2 |
| 7,511,699 | B2* | 3/2009 | Shin ..................... 345/166 |
| 7,536,573 | B2* | 5/2009 | Schumacher et al. ...... 713/320 |
| 2003/0134632 | A1 | 7/2003 | Loughran |
| 2004/0204183 | A1 | 10/2004 | Lencevicius et al. |

* cited by examiner

*Primary Examiner*—Pablo N Tran
(74) *Attorney, Agent, or Firm*—Shook, Hardy & Bacon L.L.P.

(57) ABSTRACT

Operational characteristics of a wireless input device are modified so as to balance performance and power conservation. Power management algorithms may include an algorithm that improves device performance and increases device power consumption, as well as an algorithm that decreases device power consumption and reduces device performance. An algorithm that most closely corresponds to the desired balance of performance and power consumption is identified. The identified algorithm is then transmitted to the wireless device.

20 Claims, 8 Drawing Sheets

(not to scale)

(not to scale)

|  | Gamer | Web Browser | Miser |
|---|---|---|---|
| $R_A$ | 150 reports/sec | 80 reports/sec | 40 reports/sec |
| $R_I$ | 50 reports/sec | 15 reports/sec | 10 reports/sec |
| $R_S$ | 20 reports/sec | 5 reports/sec | 2 reports/sec |
| $T_1$ | 10 sec | 1 sec | 0.2 sec |
| $T_2$ | 180 sec | 60 sec | 60 sec |
| $T_3$ | 600 sec | 300 sec | 180 sec |

FIG. 6

Power vs. Performance Profile for User 1

| | |
|---|---|
| Data Report Rate in Active Mode | [____] rep./sec. |
| Time from Active to Idle | [____] sec. |
| Data Report Rate in Idle Mode | [____] rep./sec. |
| Time from Idle to Standby | [____] sec. |
| Data Report Rate in Standby Mode | [____] rep./sec. |
| Time from Standby to Sleep | [____] sec. |

FIG. 7B

INPUT DEVICE WITH USER BALANCED PERFORMANCE AND POWER CONSUMPTION

CROSS REFERENCE TO RELATED APPLICATIONS

This application is a continuation of prior U.S. application Ser. No. 10/319,470, filed Dec. 16, 2002, the entire contents of which are incorporated herein by reference.

BACKGROUND

In many battery powered devices, there is frequently a need to balance power consumption and latency, or the speed with which the device responds to user input. Wireless computer input devices such as a computer mouse are but one example. As is known, a computer mouse generally includes motion detection components, internal circuitry for converting the detected motion into data that can be transmitted to a computer, and one or more buttons, scroll wheels, etc. In the case of a wireless mouse, the mouse further contains circuitry for wireless (typically RF) communication with a receiver that is connected to a computer. All of these mouse components require power to function, and the mouse consumes more power if these components are used more frequently.

The problem has become more acute with the advent of optically tracking mice. Unlike earlier designs in which motion is detected by a series of encoder wheels that are rotated by a rolling ball, optical mice do not require moving parts to detect motion (other than the mouse itself relative to some surface). Instead, an optical mouse takes a series of images of the surface over which it moves, and then compares the images to determine the direction and magnitude of motion. Examples of such optical input devices are described in, e.g., U.S. Pat. No. 6,303,924 (titled "Image Sensing Operator Input Device") and U.S. Pat. No. 6,172,354 (titled "Operator Input Device"). As described in those patents, an array of photo-sensitive elements generates an image of a desktop (or other surface) portion when light from an associated illumination source reflects from the desktop or other surface.

Optical input devices offer a number of advantages over devices that mechanically encode motion. However, optical devices often consume more power than mechanical designs. This is largely due to the light source that such a device uses to create an image of the desktop or other surface. Often, a Light Emitting Diode (LED) is energized and shined on the surface to be imaged. A semiconductor laser source (such as a VCSEL, or Vertical Cavity Surface Emitting Laser) may also be used. An optically tracking input device may have a substantially reduced battery life by comparison to a mechanically tracking device. Because of this, a compromise must generally be made between power consumption and performance. For example, an optical computer mouse tends to provide faster and more precise motion detection as the rate of imaging increases, i.e., by taking more image frames per second. However, more images per second requires the mouse's light source to be energized more frequently, thus drawing more power. Similarly, more frequent imaging requires increased computational activity to translate the increased number of images into data for transmission to the computer. This further requires additional power, as does the transmission of the additional data.

Wireless computer mice and other peripherals are becoming increasingly popular with computer users. Such devices often eliminate clutter and inconvenience caused by cables, are often easier to connect to a computer, and may be more suitable for use with a computer in certain locations (e.g., the kitchen or living room of a home). So as to conserve power, many wireless mice and other input devices are configured to "sleep," or to cease certain functions during periods of non-use. For example, some computer mice are configured to reduce imaging (and data reporting) frequency after a certain period of non-movement and lack of user input to a mouse button or scroll wheel. After a certain period of such non-activity, it is assumed the mouse is not needed, and the imaging frame rate is decreased. Instead of generating frequent images to detect the amount and direction of movement, the mouse generates relatively infrequent images so as to only determine whether movement has occurred at all. If motion is detected, it is assumed that the mouse is again needed, and the frame rate is increased. Although such methods can prolong battery life, they are a further source of latency which may be perceivable by a user. In particular, the reduced sleep mode frame rate, in combination with the time required to return to an "awake" mode, is perceptible to many users as a time lag between touching a sleeping mouse and the generation of a corresponding cursor movement or other screen activity. Although this problem can be alleviated somewhat by increasing the period of non-activity necessary to put the mouse "to sleep," this also increases power consumption. Moreover, it is often difficult to find the best time period for every user and software application.

Balancing performance and power consumption thus presents a significant problem in the design of wireless battery operated input devices. The problem is exacerbated by the widely varying differences among the performance requirements and preferences among different computer users and computer applications. Computer gamers, for example, often desire extremely fast response times. Other persons may use a computer for word processing and other office applications, Worldwide Web (WWW or Web) browsing and other less performance-intensive activities. These persons may instead be more concerned with frequent battery replacement. Accommodating such diverging requirements has proved difficult. In some cases, designers have created complex power management algorithms based on actual data gathered from users.

These algorithms have not always been completely successful, and there remains a need for improved methods and systems for balancing performance and power use.

SUMMARY

Aspects of the present invention allow a user to modify various operational characteristics of a wireless input device so as to achieve a desired balance between performance and power conservation. In one embodiment, power management algorithms are provided for the wireless device. The algorithms include at least one algorithm that improves device performance and increases device power consumption. The algorithms also include at least one algorithm that decreases device power consumption and reduces device performance. An algorithm that most closely corresponds to a desired balance between device performance and power consumption is identified. The identified algorithm is then transmitted to the wireless device, and the device operates in conformity with that algorithm.

In other aspects of the invention, the algorithms include one or more operational parameters for the device, and values for those parameters may be transmitted to the device. In other aspects, the power management algorithms define multiple operational modes for the device, as well as times to transition between modes. In still other aspects, an algorithm may be associated with the profile of a computer user. When that user logs on to a computer, the device will be loaded with the algorithm associated with that user. In still further aspects of the invention, the algorithm may be altered based upon the application program receiving the wireless device input. These and other features and advantages of the present invention will be readily apparent and fully understood from the following detailed description, taken in connection with the appended drawings.

BRIEF DESCRIPTION OF THE DRAWINGS

FIG. 6 is a chart showing various values for the state diagram of FIG. 5.

FIGS. 7A and 7B are examples of user interfaces for setting input device parameters according to one embodiment of the invention.

DETAILED DESCRIPTION

Aspects of the present invention provide systems and methods for a user of a wireless input device to control various operational parameters of the input device. By setting these parameters appropriately, the user is thereby able to balance power consumption and performance of the device to suit the user's particular preferences and/or needs. The invention will be described using a desk top computer and wireless computer mouse as an example of a computing environment in which the invention can be implemented. However, the invention may also be implemented with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, game consoles, network PCs, minicomputers, mainframe computers, distributed computing environments that include any of the above systems or devices, and the like. Similarly, the invention could be implemented in input devices other than computer mice. Examples of other input devices in which the invention might be embodied include wireless trackballs, keyboards, joysticks, game controllers, and any other wireless input device.

Aspects of the invention may also be implemented in the general context of computer-executable instructions, such as program modules, being executed by a computer or other processor. Generally, program modules include routines, programs, objects, components, data structures, etc. that perform particular tasks or implement particular abstract data types. The invention is not limited by any particular operating system or application software with which it may be used.

Figure 1:
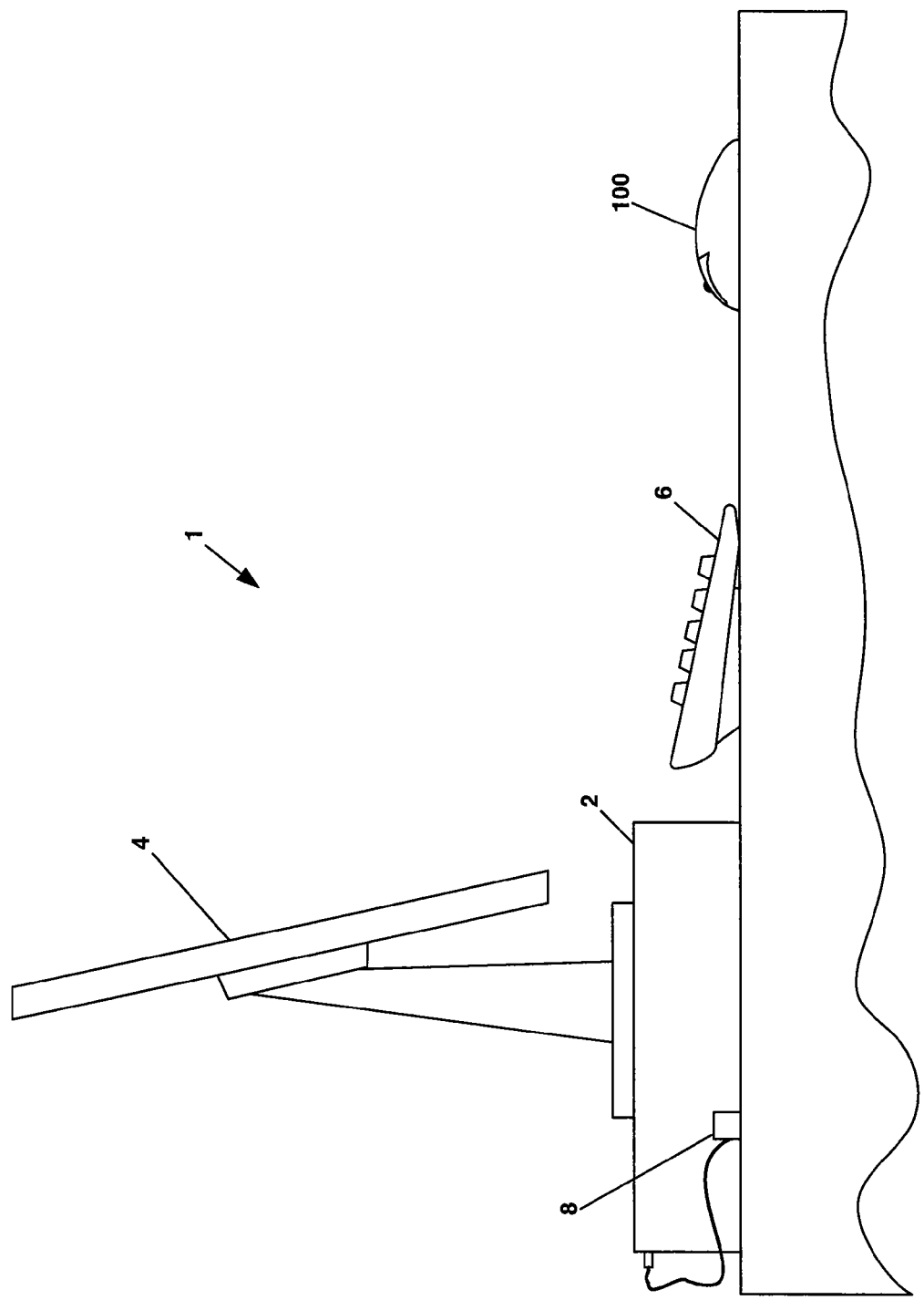
FIG. 1 is a not to scale view of a computing system environment according to one preferred embodiment of the invention.

FIG. 1 illustrates one example of a suitable computing system environment 1 on which the invention may be implemented. The computing system environment 1 is only one example of a suitable computing environment, and is not intended to suggest any limitation as to the scope of use or functionality of the invention. Shown in FIG. 1, in side view, are a desktop computer 2 having a monitor 4 and keyboard 6. Also shown is wireless mouse 100, which communicates with computer 2 via RF transceiver 8. Transceiver 8 may be connected to a USB or other port of computer 2 and be located external of computer 2 (as shown), or may alternately be internal to computer 2.

Figure 2:
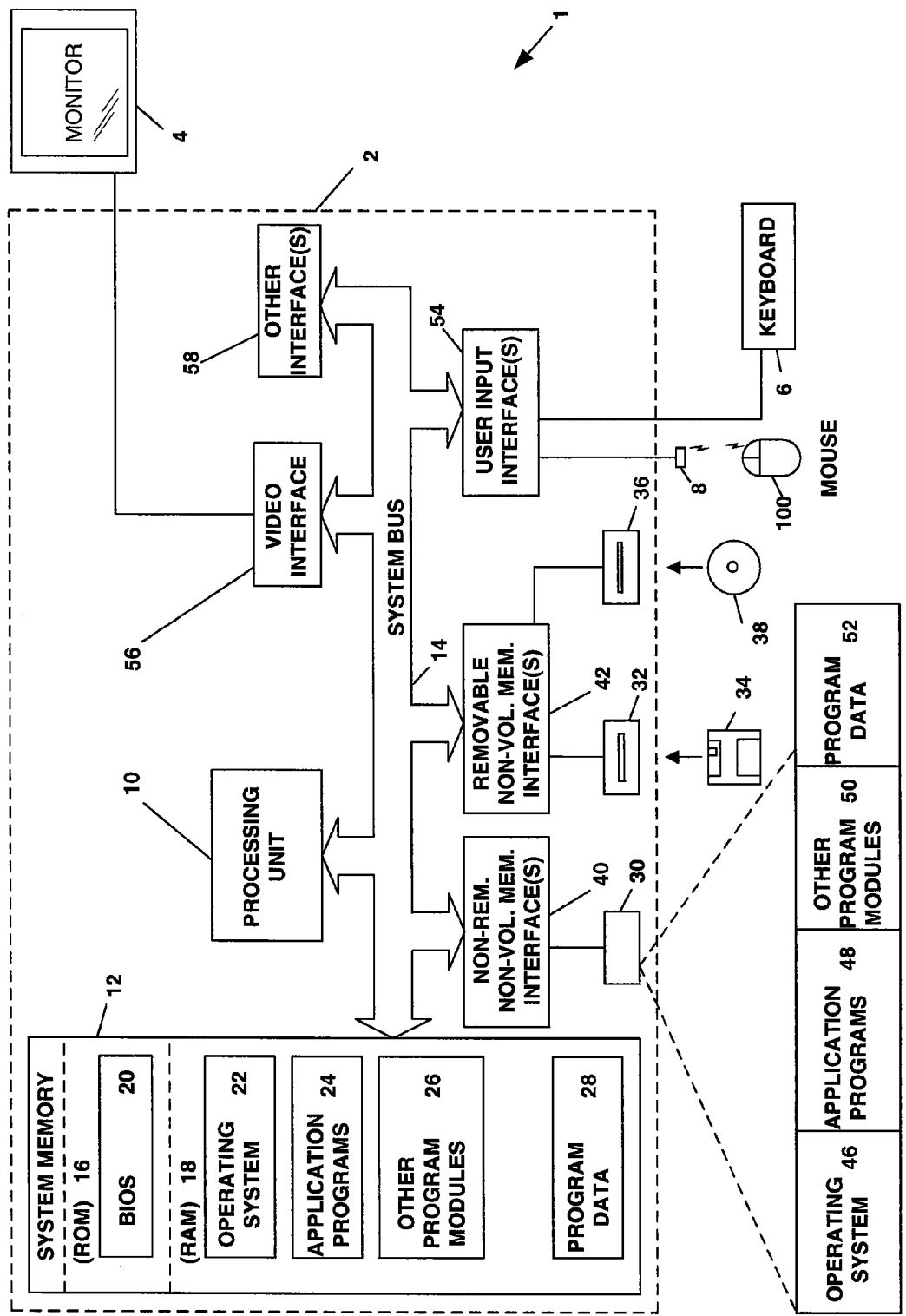
FIG. 2 is a block diagram of the computing system environment of FIG. 1.

FIG. 2 is a block diagram of computing system environment 1 of FIG. 1. Computer 2 may be a general purpose computing device, and may include such components as a processing unit 10, a system memory 12, and a system bus 14 that couples various system components including the system memory 12 to the processing unit 10. The system bus 14 may be any of several types of bus structures using any of a variety of bus architectures. Such architectures are known in the art and thus not further described herein.

Computer 2 may includes a variety of computer readable media. Computer readable media can be any available media that can be accessed by computer 2, and includes volatile, nonvolatile, removable and non-removable media. Computer readable media further includes, but is not limited to, computer storage media and communication media. Computer storage media (which may also be volatile, nonvolatile, removable or non-removable) includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

System memory 12 includes computer storage media in the form of volatile and/or nonvolatile memory such as read only memory (ROM) 16 and random access memory (RAM) 18. A basic input/output system 20 (BIOS), containing the basic routines that help to transfer information between elements within computer 2, such as during start-up, is typically stored in ROM 16. RAM 18 typically contains data and/or program modules that are immediately accessible to and/or presently being operated on by processing unit 10. By way of example, and not limitation, FIG. 2 illustrates operating system 22, application programs 24, other program modules 26 and program data 28.

Computer 2 may also include other removable, non-removable, volatile or nonvolatile computer storage media. By way of example only, FIG. 2 illustrates a hard disk drive 30 that reads from or writes to non-removable, nonvolatile magnetic media, a magnetic disk drive 32 that reads from or writes to a removable, nonvolatile magnetic disk 34, and an optical disk drive 36 that reads from or writes to a removable, non-volatile optical disk 38 such as a CD ROM or other optical media. Other removable/non-removable, volatile/nonvolatile computer storage media that can be used in the exemplary operating environment include, but are not limited to, magnetic tape cassettes, flash memory cards, digital versatile disks (DVD), digital video tape, solid state RAM, solid state ROM, and the like. The hard disk drive 30 is typically connected to the system bus 14 through a non-removable memory interface such as interface 40, and magnetic disk drive 32 and optical disk drive 36 are typically connected to the system bus 14 by one or more removable memory interface(s), such as interface(s) 42.

The drives and their associated computer storage media discussed above and illustrated in FIG. 2 provide storage of computer readable instructions, data structures, program modules and other data for the computer 2. In FIG. 2, for example, hard disk drive 30 is illustrated as storing operating system 46, application programs 48, other program modules 50 and program data 52. Note that these components can be the same or different from operating system 22, application programs 24, other program modules 26 and program data 28. Operating system 46, application programs 48, other program modules 50 and program data 52 are given different numbers to illustrate that, at a minimum, they may be additional copies of operating system 22, application programs 24, other program modules 26 and program data 28. A user may enter commands and information into the computer 2 through input devices such as a keyboard 6 and mouse 100. These and other input devices are often connected to the processing unit 10 through one or more user input interface(s) 54 that are coupled to the system bus, and may include a parallel port, a game port or a universal serial bus (USB). A monitor 4 or other type of display device is also connected to the system bus 14 via an interface, such as a video interface 56. In addition to the monitor, computers may also include other peripheral output devices such as speakers and printers (not shown). Computer 2 may have various other input and output interfaces, shown collectively as block 56. Similarly, computer 2 may operate in a networked environment using logical connections (not shown) to one or more remote computers (also not shown). Such networking environments are commonplace in offices, enterprise-wide computer networks, intranets and the Internet, and not further described herein. The various features of computer operating environment 1 shown in FIGS. 1 and 2 are intended merely to illustrate one possible environment in which the invention may be implemented. The invention may also be implemented in other environments that lack many of the features illustrated in FIGS. 1 and 2 (or described in connection therewith), as well as in environments having additional features.

As shown in FIGS. 1 and 2, mouse 100 communicates with computer 2 via RF transceiver 8. Mouse 8 encodes movement of the mouse across a desktop or other surface into data, which is then modulated into a RF signal and transmitted to transceiver 8. Similarly, movements of a mouse button, of a scroll wheel or of other input mechanisms on mouse 100 are also converted into data and transmitted via modulated RF signal to transceiver 8. Transceiver 8, via interface 54, conveys this data via system bus 14 to processor 10. Processor 10 then converts the data, under the direction of operating system 22 and/or application programs 24, into cursor or other screen movement, screen object selection, or other program events. Transceiver 8 also transmits data to mouse 100 via modulated RF signals. Unlike prior wireless mouse designs in which a computer could only receive data from the mouse, there is two-way wireless communication between computer 2 and mouse 100. For example, computer 2 can signal mouse 100 to retransmit data in the event of an error, poll mouse 8 and any other wireless devices communicating with computer 2, and periodically inquire for the presence of new wireless devices seeking to establish a wireless link with computer 2. Because computer 2 is able to transmit data to mouse 100, computer 2 can transmit data to configure components of mouse 100, and thereby control operation of mouse 100.

In one preferred embodiment, computer 2 and transceiver 8 communicate with mouse 100 in accordance with the BLUETOOTH™ standard for wireless communications, as described in, e.g., "Specification of the Bluetooth System," version 1.1 (dated Feb. 22, 2001), available from Bluetooth SIG, Inc. at <http//:www.bluetooth.com>.

Figure 3:
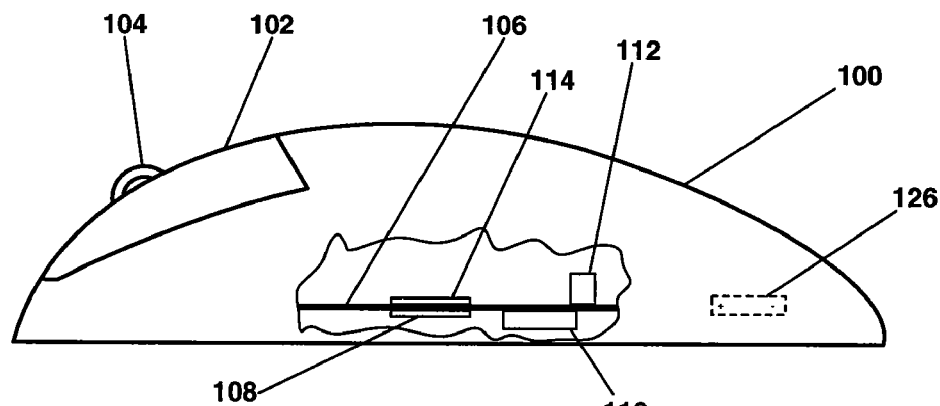
FIG. 3 is a not to scale, cutaway side view of the wireless mouse of FIG. 1.

FIG. 3 is a side, cutaway view of mouse 100. Mouse 100 may have one or more buttons 102 which can be pressed by a user, a scroll wheel 104, or other types of input controls which can be actuated by a user. The number, arrangement and types of input controls shown are merely exemplary, and other combinations and arrangements are within the scope of the invention. The operation of switches, scroll wheels and other types of input controls is known in the art and thus not further described herein. Mouse 100 may also have one or more internal circuit boards 106 or other substrates upon which various electronic components are connected and physically supported. These components may include an imaging array 108, a LED or laser source 110, a RF antenna 112, a controller 114 and a battery/power source 126. Other components, not shown in FIG. 3, may include memory and other electrical components. LED or laser source 110 emits light which illuminates an area of a desktop or other surface, and which is imaged by imaging array 108. Images from array 108 are then compared to detect movement of mouse 100 across the desktop or other surface.

Figure 4:
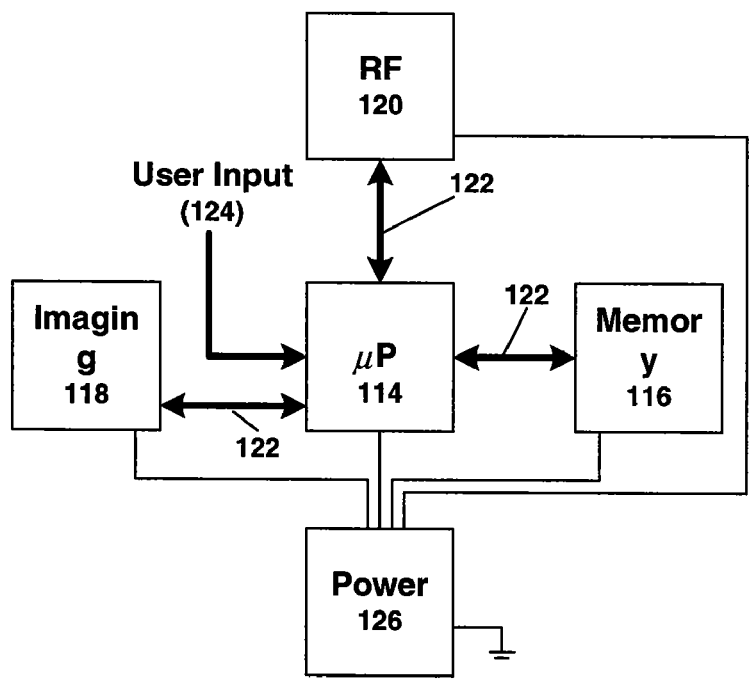
FIG. 4 is a block diagram for circuitry of the mouse of FIGS. 1 and 3.

FIG. 4 is a block diagram of the internal circuitry of mouse 100 according to one preferred embodiment of the invention. Operation of mouse 100 is controlled by a microprocessor (μP) controller 114. Although controller 114 is shown as a microprocessor, controller 114 could alternatively include state machine circuitry or other suitable components capable of controlling operation of mouse 100 as described herein. Controller 114 communicates with memory 116. Memory 116, which may include volatile and non-volatile memory, is used for storage of software (or firmware) instructions, imaging data and configuration settings (as discussed in more detail below). Memory 116 may include a non-volatile component, such as a battery-backed SRAM or EEPROM. Controller 114 also controls LED or laser source 110 (FIG. 3) and imaging array 108 (FIG. 3), as well as other imaging elements, all of which are represented collectively by block 118. Controller 114 further controls RF communication circuitry 120, and passes data to RF communication circuitry 120 for communication to computer 2 over antenna 112 (FIG. 3). Similarly, data communicated to mouse 100 is received via antenna 112 (FIG. 3) and RF circuitry 120, and transmitted to controller 114. Controller 114 communicates with imaging elements 118, RF circuitry 120 and memory 116 over one or more buses 122, shown collectively as bold bi-directional arrows. Controller 114 also receives electrical signals that correspond to a user's actuation of a mouse button 102 (FIG. 3), scroll wheel 104 (FIG. 3) or other input control. These electrical signals are represented collectively by User Input 124. The various electrical components of mouse 100 are powered by a power source 126, which could include one or more batteries.

Although FIG. 4 shows controller 114, imaging circuitry 118, RF circuitry 120 and memory 116 as discrete components, this need not be the case. For example, one or more of these components might be contained in a single Integrated Circuit (IC) or other component. As another example, controller 114 may include internal program memory such as ROM. Similarly, the herein described functions of these components could be distributed across additional components (e.g., multiple controllers or other components).

The present invention permits a mouse user to choose between multiple power management algorithms. These multiple algorithms can be communicated from computer 2 to mouse 100. As used herein "multiple algorithms" includes situations where one algorithm has steps, functions and/or instructions that may be absent from another algorithm. In such a situation, a new algorithm might be transmitted to mouse 100 by transmitting new steps, functions and/or instructions. "Multiple algorithms" also includes situations wherein a collection of steps, functions and/or instructions has one or more variables; if one or more variable values are changed, a different algorithm results. In this situation, and as explained in more detail below, a new algorithm may be transmitted to mouse 100 by transmitting new variable values. As yet another possibility, a new algorithm may be transmitted to a device as a pointer or other identifier corresponding to steps, functions and/or instructions (and/or variable values) that have previously been stored on mouse 100.

At one extreme, a power management algorithm can be configured for maximum performance (e.g., lowest latency) without regard to battery life. At the other extreme, a power management algorithm may be configured to maximize battery life without regard to performance degradation. Any number of power management algorithms can be created between these two extremes. These power management algorithms may be pre-configured (e.g., included as part of software loaded onto computer 2 for operation of mouse 100), or may be customized and/or created by a user. A user may choose between (or create or customize) these algorithms using various types of user interfaces to computer 2. Once chosen, computer 2 transmits the selected algorithm to mouse 100. The algorithm may be transmitted as a series of programming instructions, which may then be loaded and executed by controller 114 on device 100. Alternatively, any necessary programming instructions or other commands may have previously been transmitted to mouse 100, or may be otherwise preloaded into ROM or other nonvolatile memory on mouse 100. In such a case, it might only be necessary to transmit new variable values in order to transmit a new algorithm. In such case, the new variable values are stored by mouse 100. Mouse 100 implements the stored algorithm until it receives another transmission from computer 2 of a new algorithm. For example, the user may decide to modify settings of mouse 100 that he or she previously implemented. Computer 2 might also store multiple algorithms which correspond to multiple users or to multiple application programs; when a new user logs onto computer 2, a new algorithm may be transmitted to mouse 100. Similarly, a new algorithm may be automatically transmitted to mouse 100 when a new application starts on computer 2.

Figure 5:
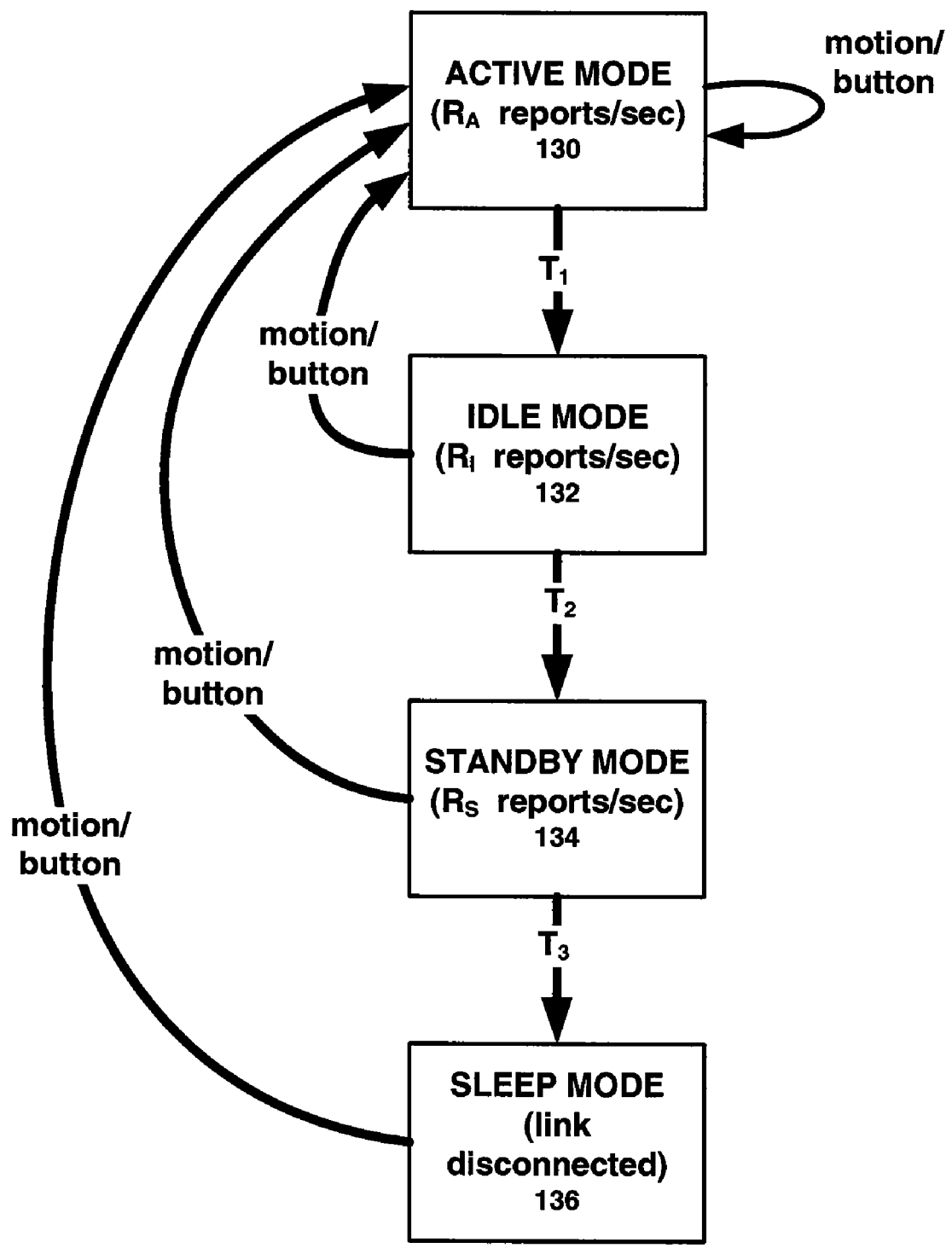
FIG. 5 is a state diagram for a wireless input device according to one preferred embodiment of the invention.

FIG. 5 is a state diagram that describes several algorithms in one preferred embodiment of the invention. In this embodiment, mouse 100 has 4 modes: Active (130), Idle (132), Standby (134) and Sleep (136). When in Active mode, mouse 100 is presumed to be in use, and generates data reports for transmission to computer 2 at the rate of $R_A$ reports per second. Each data report roughly corresponds to a comparison of two images of the desk top or other surface across which mouse 100 moves. $R_A$ therefore roughly corresponds to the number of images per second (or the frame rate). In Active mode, $R_A$ is at its highest value, and thus power consumption, tracking accuracy and tracking speed are also highest. Mouse 100 remains in Active mode so long as there is mouse movement or a button (or scroll wheel) activation every $T_1$ seconds. If there is no movement or button/scroll wheel activity after $T_1$ seconds, mouse 100 drops to Idle mode. In Idle mode, mouse 100 generates data reports at the rate of $R_I$ reports per second, which roughly corresponds to a frame rate of $R_I$ frames per second. In Idle mode, it is presumed that there is only a momentary lapse in user need for mouse 100, and that the user will soon need to move a cursor (or otherwise use mouse 100). When the user moves mouse 100, the motion is detected, and the mouse returns to Active mode. Similarly, activation of a button or scroll wheel returns mouse 100 to Active mode. The frame rate is decreased significantly in Idle mode to save power, but not decreased so much that the user will perceive any latency (or will only perceive minimal latency) when returning to Active mode. The maximum latency in Idle mode is on the order of $1/R_I$ seconds, where $R_I$ is the Idle mode frame rate.

If there is no mouse motion or button/scroll wheel action after mouse 100 has been in Idle mode for $T_2$ seconds, mouse 100 drops into Standby mode. In Standby mode, mouse 100 generates data reports at the rate of $R_S$ reports per second, which roughly corresponds to a frame rate of $R_S$ frames per second. In Standby mode, it is presumed that, because of the longer lapse in use of mouse 100, the user will not immediately need to move a cursor (or otherwise use mouse 100). When the user does move mouse 100, the motion is detected, and the mouse returns to Active mode. Similarly, activation of a button or scroll wheel returns mouse 100 to Active mode. The frame rate is decreased slightly more in Standby mode to save additional power. Because mouse 100 would theoretically go into Standby mode less frequently, and a user may be willing to accept some occasional latency, the user may perceive a slight (or a slightly longer) delay when returning to Active mode with a maximum delay on the order of $1/R_S$ seconds where $R_S$ is the frame rate in Standby mode.

If there is no mouse motion or button/scroll wheel action after mouse has been in Standby mode for $T_3$ seconds, mouse 100 drops into Sleep mode. In Sleep mode, the two-way link with computer 2 is "disconnected," i.e., no data is transmitted to computer 2 ($R_{SLEEP}$=0) by mouse 100 or vice versa. The frame rate is not zero, however. Instead, the frame rate is decreased to a minimal level. Any mouse motion or button/scroll wheel activity returns mouse 100 to Active mode, but with greater delay than when returning to Active mode from Idle or Standby modes. Mouse motion or button/scroll wheel activity also causes mouse 100 to re-establish a link with computer 2. In Sleep mode, it is assumed that the user has left the computer or is otherwise not going to need to use mouse 100 in the near future.

FIG. 6 is a chart showing various example values for $R_A$, $R_I$, $R_S$, $T_1$, $T_2$ and $T_3$ for various algorithms. The first algorithm ("Gamer") is intended for a user who desires high performance (high data report rate, low latency, smooth and precise cursor control), and is less concerned about battery life. Under the Gamer algorithm, $R_A$ is 150 reports/second, $R_I$ is 50 reports/second and $R_S$ is 20 reports/second. For the Gamer algorithm, mouse 100 goes from Active mode to Idle mode after 10 seconds of inactivity ($T_1$), from Idle mode to Standby mode after 180 seconds of inactivity ($T_2$) and from Standby mode to Sleep mode after 600 seconds of inactivity ($T_3$). The next algorithm ("Web Browser") is intended for a user who desires more of a balance between high performance and battery life. Under the Web Browser algorithm, $R_A$ is 80 reports/second, $R_I$ is 15 reports/second and $R_S$ is 5 reports/second. For the Web Browser algorithm, mouse 100 goes from Active mode to Idle mode after 1 second of inactivity ($T_1$), from Idle mode to Standby mode after 60 seconds of inactivity ($T_2$) and from Standby mode to Sleep mode after 300 seconds of inactivity ($T_3$). Finally, the "Miser" algorithm is intended for a user whose primary concern is long battery life and who may primarily use the computer for, e.g., word processing. Under the Miser algorithm, $R_A$ is 40 reports/second, $R_I$ is 10 reports/second and $R_S$ is 2 reports/second. For the Miser algorithm, mouse 100 goes from Active mode to Idle mode after 0.2 seconds of inactivity ($T_1$), from Idle mode to Standby mode after 60 seconds of inactivity ($T_2$) and from Standby mode to Sleep mode after 180 seconds of inactivity ($T_3$). Numerous other algorithms are also possible.

In one preferred embodiment, values for $R_A$, $R_I$, $R_S$, $T_1$, $T_2$ and $T_3$ are stored as individual settings in non-volatile storage in mouse 100. A "new" algorithm is thus transmitted to mouse 100 by transmitting new values for one or more of these variables. In this manner, firmware within mouse 100 can implement a wide variety of power management algorithms by simply referencing values stored for a relatively small number of variables. In such an embodiment, non-volatile storage of the values for $R_A$, $R_I$, $R_S$, $T_1$, $T_2$ and $T_3$ could allow mouse 100 to "remember" which algorithm it should use from one computer session to another. In other embodiments, non-volatile memory may not be provided. Instead, the power management parameters could be transmitted each time a mouse wakes from Sleep mode. In yet other embodiments, parameter values could be stored in internal SRAM within controller 114; the controller would not be completely powered off during Sleep mode, but would instead only stop its clock. In still other embodiments, multiple values for some or all of $R_A$, $R_I$, $R_S$, $T_1$, $T_2$ and $T_3$ could be stored in ROM or other volatile or nonvolatile memory on mouse 100. To transmit a new algorithm to mouse 100, it would only be necessary to transmit a pointer to the desired value(s).

A user may select from one of various power management algorithms, or create a customized algorithm, by using software on computer 2. Such software could be installed onto computer 2 via removable media (such as disks 34 or 38 in FIG. 2) or by other means (e.g., download over a network connection), or executed directly from a removable media. Such software could also provide various types of user interfaces on computer 2. Upon selection of an algorithm by a user, the software causes computer 2 to transmit the algorithm to mouse 100 via transceiver 8. Mouse 100 then stores the transmitted algorithm in memory 116, and controller 114 controls mouse 100 based on that algorithm. As indicated above, the selected algorithm could be transmitted by computer 2 (and stored by mouse 100) as a set of values for variables such as $R_A$, $R_I$, $R_S$, $T_1$, $T_2$ and $T_3$.

Figure 7A:
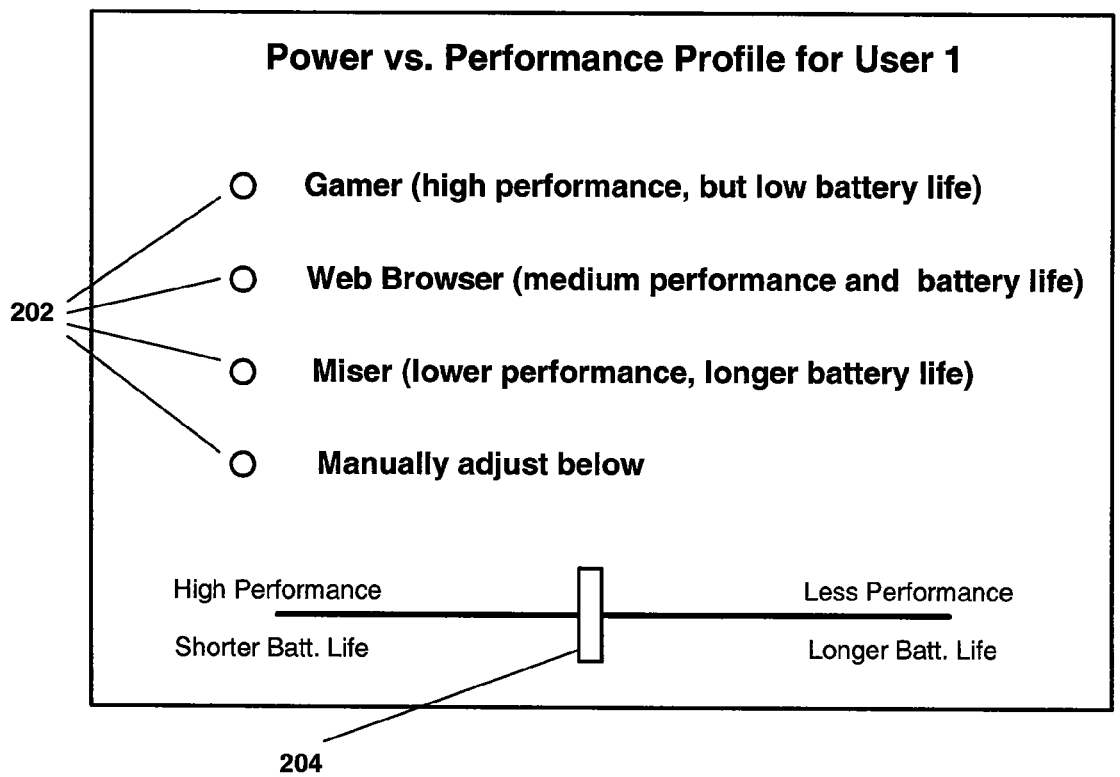

FIG. 7A is one possible example of a user interface to computer 2 for selecting and/or modifying a power management algorithm for mouse 100. As seen in FIG. 7A, the user may be presented with a series of radio buttons 202 or similar Graphical User Interface (GUI) components that permit the user to select from various pre-configured power management algorithms. The user might also be presented with a slider bar 204 or similar GUI component that allows the user to alter the configuration settings from those of the pre-configured selections. For example, movement of the slider bar 204 to the left might cause values for $R_A$, $R_I$, $R_S$, $T_1$, $T_2$ and $T_3$ to increase (higher performance, shorter battery life), while movement of the slider 204 bar to the right might cause values for $R_A$, $R_I$, $R_S$, $T_1$, $T_2$ and $T_3$ to decrease (lower performance, longer battery life). FIG. 7B is an example of a possible user interface wherein the user is allowed to explicitly set values for $R_A$, $R_I$, $R_S$, $T_1$, $T_2$ and $T_3$. As seen in both FIGS. 7A and 7B, different users of computer 2 (e.g., "User 1") can configure mouse 100 to operate according to an individual user's preference. When the individual user logs onto computer 2, that user's preferences are automatically transmitted to mouse 100.

Figure 8:
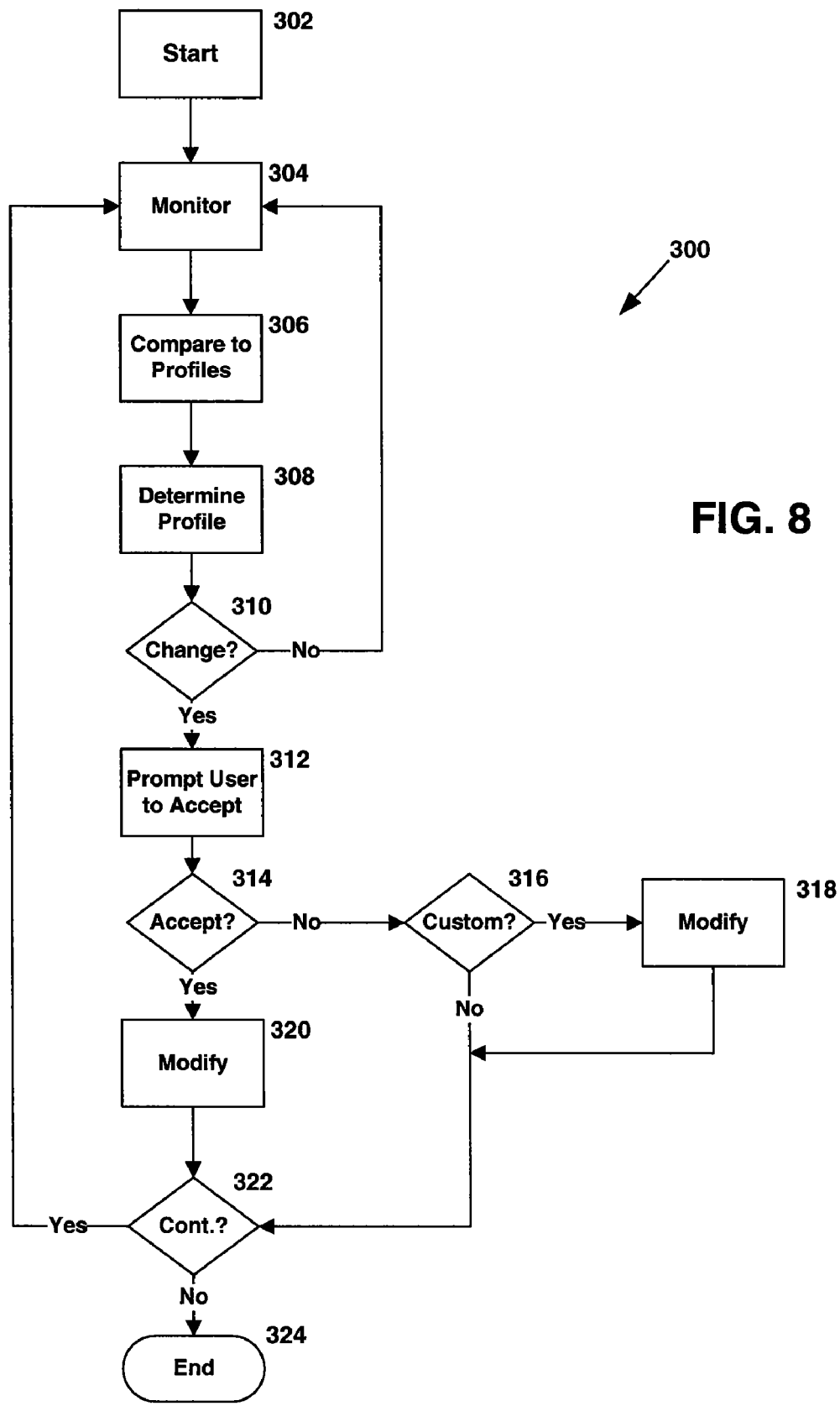
FIG. 8 is a flow chart showing operation of another aspect of the invention.

In another aspect of the invention, software on computer 2 (such as the algorithm selection software described above) might cause computer 2 to automatically adapt mouse 100 to a particular user's style of mouse usage. In other words, computer 2 can monitor a user's mouse activity for a certain time interval, and then compare that activity with various pre-existing usage profiles (such as, but not necessarily limited to, profiles matching the Gamer, Web Browser and Miser algorithms of FIG. 6). Upon comparing the user's activity with the pre-existing profiles, a most-closely-matching profile is identified. The user might then be prompted as to whether he or she wishes to modify the mouse performance characteristics in conformity with that profile. FIG. 8 is a flow chart describing one possible process 300 for carrying out this additional aspect of the invention. After starting at step 302, various aspects of the user's mouse activities are monitored at 304. Possible examples include the magnitude and speed of cursor movements, the time between cursor movements, the amount and timing of mouse button actions, number and durations of periods of inactivity, etc. At step 306, the user's activities are compared to values for those activities stored for various pre-existing user profiles. At step 308, a determination is made as to which of the pre-existing profiles most closely corresponds to the monitored user activities. At step 310, a determination is made as to whether the profile determined at step 308 represents a change from the user's current settings for mouse 100. If no, the process returns to step 304. If yes, the user is prompted at step 312 and given the opportunity at 314 to modify the mouse settings to accept an algorithm corresponding to the profile determined at step 308. If the user does not wish to accept that algorithm, he or she is provided an opportunity to create a custom algorithm at 316. If the user decides to create a custom algorithm, he or she does so at step 318 (using, e.g., a GUI such as FIG. 7A or 7B). Upon creating the custom algorithm, the user is provided an option at 322 to disable the mouse activity monitoring feature (i.e., disable process 300). If the user elects to continue such monitoring ("yes"), the process loops back to step 304. Otherwise ("no"), the process ends at 324. If the user had not chosen to create a custom algorithm at step 316, the process would have then continued to step 322. If the user had decided to accept the offered algorithm at step 314, the mouse settings would have been modified at step 320. From step 320, the user would have then had the option to continue monitoring mouse activity.

As indicated above, the invention can be implemented in computers other than that shown in FIGS. 1 and 2. Similarly, devices other than computer mice can be controlled according to the invention. Examples include trackballs, joysticks, game controllers, microphones and touch pads. Moreover, operating parameters other than data rate, imaging frame rate and time between operational modes can be adjusted according to a power management algorithm. As but one example, some computer mice have "tail lights" or other external illumination for decorative and/or functional purposes. Some users might determine that the tail light or other external illumination is not needed; by turning the tail light off, battery power may be conserved. As but another possible example, some game controllers and other input devices have force feedback components. Certain users may opt to modify the intensity of the force feedback (or forego it altogether) in order to conserve power. Modification of these and other operational characteristics are within the scope of the invention.

In still other embodiments, a power management algorithm may be changed based on the particular software application in use. For example, a mouse program operating on computer 2 could monitor which application is currently active. The mouse program could then transmit an algorithm to mouse 100 which is optimized for the active application. For example, a computer game might be started or otherwise become an active application. The mouse program could then transmit a power management algorithm to mouse 100 that increases data reporting rate and reduces latency. If a word processing application is then activated, an algorithm with reduced data rate and increased latency could be transmitted to mouse 100. The mouse program could also be user-customizable by, e.g., permitting user assignment of algorithms to applications.

Although specific examples of carrying out the invention have been described, those skilled in the art will appreciate that there are numerous variations and permutations of the above described systems and techniques that fall within the spirit and scope of the invention as set forth in the appended claims. As but one additional example of such a variation, a wireless device might communicate via infrared (IR) or other electromagnetic frequencies, or via ultrasonic transmissions. These and other modifications are within the scope of the invention as defined by the attached claims.

The invention claimed is:

1. A method of controlling performance and power consumption in a wireless computer input device, comprising:
   providing a plurality of power management algorithms for the wireless computer input device, the algorithms including a first algorithm improving performance and increasing power consumption and a second algorithm decreasing power consumption and reducing performance;
   identifying, from the plurality of power management algorithms, an algorithm that most closely corresponds to a desired balance of performance and power consumption;
   transmitting the identified algorithm to the wireless computer input device via wireless communication;
   operating the wireless computer input device in conformity with the transmitted algorithm;
   monitoring usage of the wireless computer input device during a time interval; and
   comparing usage during the time interval with multiple pre-established usage profiles, each of the usage profiles having an associated algorithm, and wherein:
      identifying the algorithm comprises selecting the algorithm associated with the usage profile that most closely matches the usage.

2. The method of claim 1, further comprising storing the power management algorithms in a computer, and wherein identifying an algorithm comprises selecting an algorithm from the stored algorithms.

3. The method of claim 2, further comprising:
   presenting a display to a computer user allowing the computer user to select an algorithm; and
   receiving an algorithm selection from the computer user.

4. The method of claim 2, further comprising receiving input from a computer user modifying a stored algorithm.

5. The method of claim 1, further comprising:
   associating the first algorithm with a first application software program and associating the second algorithm with a second application software program, and wherein identifying an algorithm comprises identifying the first algorithm if the first application software program is active and identifying the second algorithm if the second application software program is active.

6. The method of claim 1, wherein transmitting the identified algorithm comprises transmitting a pointer to data stored on the wireless computer input device.

7. A method of controlling performance and power consumption in a wireless computer input device, comprising:
   providing a plurality of power management algorithms for the wireless computer input device, the algorithms including a first algorithm improving performance and increasing power consumption and a second algorithm decreasing power consumption and reducing performance;
   identifying, from the plurality of power management algorithms, an algorithm that most closely corresponds to a desired balance of performance and power consumption;
   transmitting the identified algorithm to the woreless computer input device via wireless communication; and
   operating the wireless computer input device in conformity with the transmitted algorithm,
      wherein each algorithm comprises a set of values for the parameter variable in each mode, each set of values comprising a data report rate corresponding to a frequency in which images are sampled by the wireless computer input device and compared with other images sampled by the wireless computer input device.

8. The method of claim 7, wherein:
   providing a plurality of power management algorithms further comprises defining a plurality of time variables corresponding to times to transition between modes after periods of non-use, and wherein each algorithm further comprises a set of values for the time variables.

9. The method of claim 8, wherein:
   defining a plurality of modes comprises defining an active mode, an idle mode, a standby mode and a sleep mode,
   the parameter variable comprises a data reporting rate,
   the time variables comprise a time to transition from active mode to idle mode, a time to transition from idle mode to standby mode, and a time to transition from standby mode to sleep mode.

10. The method of claim 7, wherein the parameter variable is a frame rate for an imaging device.

11. A computer-readable medium having computer-executable commands for performing steps comprising:
   storing a plurality of power management algorithms for a wireless computer input device, the algorithms including a first algorithm improving performance and increasing power consumption and a second algorithm decreasing power consumption and reducing performance;
   monitoring usage of the wireless computer input device during a time interval;
   comparing usage during the time interval with multiple pre-stored usage profiles, each of the pre-stored usage profiles having an associated algorithm for operating the wireless computer input device;
   receiving identification of an algorithm associated with a pre-stored usage profile that most closely matches the usage; and
   transmitting the algorithm to the wireless computer device via wireless communication.

12. The computer-readable medium of claim 11, wherein:
the plurality of power management algorithms comprises a plurality of modes having a parameter variable corresponding to a setting for a device parameter, and wherein each algorithm comprises a set of values for the parameter variable in each mode.

13. The computer-readable medium of claim 12, wherein:
the plurality of power management algorithms further comprises a plurality of time variables corresponding to times to transition between modes after periods of non-use, and wherein each algorithm further comprises a set of values for the time variables.

14. The computer-readable medium of claim 13, wherein:
the plurality of modes comprises an active mode, an idle mode, a standby mode and a sleep mode,
the parameter variable comprises a data reporting rate,
the time variables comprise a time to transition from active mode to idle mode, a time to transition from idle mode to standby mode, and a time to transition from standby mode to sleep mode.

15. The computer-readable medium of claim 12, wherein the parameter variable is a frame rate for an imaging device.

16. The computer-readable medium of claim 11, comprising further computer-executable commands for performing steps comprising:
presenting a display to a computer user allowing the computer user to select an algorithm; and
receiving an algorithm selection from the computer user.

17. The computer-readable medium of claim 16, wherein the display comprises a Graphical User Interface (GUI).

18. The computer-readable medium of claim 11, comprising further computer-executable commands for performing steps comprising: receiving input from a computer user modifying a stored algorithm.

19. The computer-readable medium of claim 11, comprising further computer-executable commands for performing steps comprising: receiving input from a computer user providing parameter values.

20. The computer readable medium of claim 11, comprising further computer-executable commands for performing steps comprising:
associating the first algorithm with a first application software program and associating the second algorithm with a second application software program, and wherein
indentifying an algorithm comprises identifying the first algorithm if the first application software program is active and identifying the second algorithm if the second application software program is active.

\* \* \* \* \*